US012674310B2

(12) United States Patent
Brandli et al.

(10) Patent No.: US 12,674,310 B2
(45) Date of Patent: Jul. 7, 2026

(54) ROTATIONALLY MOLDED LIGATURE RESISTANT TOILET

(71) Applicant: Willoughby Industries Inc, Indianapolis, IN (US)

(72) Inventors: Timothy Brandli, Zionsville, IN (US); William Craig Alderson, Brownsburg, IN (US)

(73) Assignee: Willoughby Industries Inc, Indianapolis, IN (US)

( * ) Notice: Subject to any disclaimer, the term of this patent is extended or adjusted under 35 U.S.C. 154(b) by 199 days.

(21) Appl. No.: 18/591,779

(22) Filed: Feb. 29, 2024

(65) Prior Publication Data

US 2024/0295111 A1     Sep. 5, 2024

Related U.S. Application Data

(60) Provisional application No. 63/487,738, filed on Mar. 1, 2023.

(51) Int. Cl.
E03D 11/02          (2006.01)
B29C 41/04          (2006.01)
(Continued)

(52) U.S. Cl.
CPC .............. E03D 11/02 (2013.01); B29C 41/04 (2013.01); E03D 11/135 (2013.01); B29L 2031/7694 (2013.01)

(58) Field of Classification Search
CPC ....... E03D 11/02; E03D 11/135; B29C 41/04; B29L 2031/7694
(Continued)

(56) References Cited

U.S. PATENT DOCUMENTS 1,998,861 A * 4/1935 Campus .................... E03D 3/04
                                                    251/44
4,145,776 A * 3/1979 Crosby .............. B29C 49/0005
                                                    4/421
(Continued)

FOREIGN PATENT DOCUMENTS

BR       PI1104651 A2 * 8/2013   ............. B29C 51/22
CA       2960809 A1 * 9/2017   ............. A47K 13/00
(Continued)

OTHER PUBLICATIONS

Thinktank Waterless Toilets From Composting Toilets USA [online], [retrieved on Feb. 29, 2024], Retrieved from <https://compostingtoiletsusa.com/thinktank-waterless-toilets/>.
(Continued)

*Primary Examiner* — Lori L Baker
(74) *Attorney, Agent, or Firm* — Woodard, Emhardt, Henry, Reeves & Wagner, LLP

(57) ABSTRACT

A ligature resistant toilet includes a frame that surrounds a bowl assembly. The frame may be made by rotational molding to create a seamless, one-piece component. The frame includes a front surface, a left surface, and a right surface that are all connected to a top surface by a rounded transition surface. A seat assembly is defined on the top surface of the frame and includes a seat that defines a bowl opening. The frame supports a bowl assembly that is positioned within a hollow interior of the frame. The bowl assembly includes a bowl and a spray ring supported by a top surface of the bowl. Piping may be attached to a trapway of the bowl assembly and extend exterior to the frame to an exterior plumbing system.

18 Claims, 10 Drawing Sheets

(51) Int. Cl.
B29L 31/00 (2006.01)
E03D 11/13 (2006.01)

(58) Field of Classification Search
USPC ..................... 4/420, 300, 256.1, 905, 901
See application file for complete search history.

(56) References Cited

U.S. PATENT DOCUMENTS

| | | | | |
|---|---|---|---|---|
| 4,162,548 A * | 7/1979 | Groombridge | ......... | E03D 11/02 |
| | | | | 4/300 |
| 4,246,227 A * | 1/1981 | Crosby | ............ | B29C 49/04112 |
| | | | | 425/525 |
| 4,996,726 A * | 3/1991 | Schrock | .................... | E03D 1/36 |
| | | | | 4/300 |
| 5,054,133 A * | 10/1991 | Pickerrell | .............. | E03D 11/08 |
| | | | | 4/329 |
| 5,067,181 A * | 11/1991 | Hafner | .................... | E03D 11/08 |
| | | | | 4/430 |
| 5,271,105 A * | 12/1993 | Tyler | ....................... | E03F 1/006 |
| | | | | 251/63 |
| 5,283,913 A * | 2/1994 | Jaeckels | .................. | E03D 11/08 |
| | | | | 4/421 |
| 5,832,546 A * | 11/1998 | Inch | .......................... | E03D 3/00 |
| | | | | 4/333 |
| 6,108,826 A * | 8/2000 | Hayashi | ............... | H04N 21/434 |
| | | | | 348/E5.005 |
| 6,112,935 A | 9/2000 | Shackelford | | |
| 6,142,035 A * | 11/2000 | Babatz | .................... | E05B 83/36 |
| | | | | 292/201 |
| 7,263,758 B2 * | 9/2007 | Davies | ..................... | B28B 1/26 |
| | | | | 4/300 |
| 7,975,325 B2 * | 7/2011 | Holmstadt | ........... | E04H 1/1216 |
| | | | | 4/476 |
| 8,091,157 B2 * | 1/2012 | Tyler | .................... | E04H 1/1216 |
| | | | | 4/479 |
| 8,225,432 B1 * | 7/2012 | Price | ....................... | E03D 11/13 |
| | | | | 4/256.1 |
| 8,448,269 B2 * | 5/2013 | Libit | ...................... | A47K 3/122 |
| | | | | 4/584 |
| 9,003,577 B2 * | 4/2015 | Kopp | .................. | E03C 1/0412 |
| | | | | 4/677 |
| 9,328,498 B2 * | 5/2016 | Chen | ......................... | E03D 7/00 |
| 9,371,135 B2 * | 6/2016 | Beach | ...................... | E03D 9/05 |
| 9,784,006 B2 * | 10/2017 | Brown | ................. | E04H 1/1216 |
| 9,845,593 B2 * | 12/2017 | Hall | ...................... | E03D 11/135 |
| 10,030,377 B1 * | 7/2018 | Boeltl | ................. | A47K 13/302 |
| 10,066,409 B2 * | 9/2018 | Sansom, III | ............. | E03D 7/00 |
| 11,255,097 B2 * | 2/2022 | Bikker | .................. | A47K 11/02 |
| 11,591,786 B2 * | 2/2023 | Helmstetter | ............ | E03D 11/13 |
| 11,624,178 B2 * | 4/2023 | Eto | ........................... | E03D 3/00 |
| | | | | 4/432 |
| 11,649,617 B2 * | 5/2023 | Pendleton | ............... | E03B 1/041 |
| | | | | 4/665 |
| 11,913,207 B2 * | 2/2024 | Schibur | .................... | E03D 11/02 |
| 2005/0115042 A1 * | 6/2005 | Davies | .................... | B28B 1/002 |
| | | | | 29/401.1 |
| 2013/0219605 A1 * | 8/2013 | Grover | .................... | E03D 11/08 |
| | | | | 4/300.3 |
| 2014/0007335 A1 * | 1/2014 | Ukaegbu | ................. | A47K 11/04 |
| | | | | 4/300 |
| 2014/0137319 A1 * | 5/2014 | Beach | ..................... | E03D 5/003 |
| | | | | 4/431 |
| 2018/0334789 A1 * | 11/2018 | Schibur | ................... | B28B 1/261 |
| 2018/0355598 A1 * | 12/2018 | Villalobos Lopez | ... | E03D 11/02 |
| 2019/0292763 A1 * | 9/2019 | Boeltl | ...................... | E03D 11/17 |
| 2020/0037774 A1 * | 2/2020 | Moon | .................... | A47C 19/20 |
| 2021/0108404 A1 * | 4/2021 | Harrison | ................ | E03D 11/13 |
| 2022/0112891 A1 | 4/2022 | Coffey et al. | | |
| 2022/0412894 A1 * | 12/2022 | Kawamura | ............ | G01N 21/88 |
| 2023/0100206 A1 * | 3/2023 | Hashimoto | ............. | E03D 11/08 |
| | | | | 4/300 |
| 2023/0183963 A1 * | 6/2023 | Schibur | ................... | E03D 11/13 |
| | | | | 4/420 |
| 2024/0287778 A1 * | 8/2024 | Okabe | ..................... | E03D 11/08 |
| 2025/0092657 A1 * | 3/2025 | Boeltl | ...................... | E03D 11/16 |

FOREIGN PATENT DOCUMENTS

| | | | | | | |
|---|---|---|---|---|---|---|
| CN | | 105145392 A | * | 12/2015 | ............ | A01K 7/025 |
| EP | | 3486384 A1 | * | 5/2019 | ............ | E03D 11/02 |
| EP | | 3540134 A1 | * | 9/2019 | ............ | E03D 11/02 |
| EP | | 3540134 B1 | * | 7/2020 | .......... | E03D 11/143 |
| GB | | 2045311 A | * | 10/1980 | ............ | E03D 11/02 |
| GB | | 2490523 A | * | 11/2012 | ............ | E03D 11/02 |
| JP | WO2004028995 A1 | | * | 1/2006 | ............ | E03D 11/02 |
| KR | | 102074681 B1 | * | 2/2020 | ............ | E03D 11/02 |
| WO | WO-2004022862 A1 | | * | 3/2004 | ............ | E03D 11/02 |
| WO | WO-2006085575 A1 | | * | 8/2006 | ............ | E03D 11/08 |
| WO | WO-2011054056 A1 | | * | 5/2011 | ............ | E03D 11/02 |
| WO | WO-2012034962 A1 | | * | 3/2012 | ............ | E03F 1/006 |
| WO | WO-2014078461 A2 | | * | 5/2014 | ............ | E03D 1/145 |
| WO | WO-2014081912 A2 | | * | 5/2014 | ............ | E03F 1/006 |
| WO | | 2015028059 A1 | | 3/2015 | | |
| WO | WO-2016055959 A1 | | * | 4/2016 | ............ | B29C 41/04 |
| WO | WO-2018028059 A1 | | * | 2/2018 | ............... | C02F 9/00 |
| WO | WO-2019218150 A1 | | * | 11/2019 | ............ | E04H 1/12 |
| WO | WO-2020193395 A1 | | * | 10/2020 | ............ | E03D 11/13 |

OTHER PUBLICATIONS

PE Mobile Wash Basin [online], [retrieved on Feb. 29, 2024], Retrieved from <https://www.toprotomolding.com/pe-mobile-wash-basin.html>.

* cited by examiner

ROTATIONALLY MOLDED LIGATURE RESISTANT TOILET

BACKGROUND

Ligature resistant products are important features for rooms in healthcare facilities and other environments where there is a danger that an occupant may accidentally injury themselves or try to cause harm to themselves or to others. In particular, surfaces where an occupant may drape or wrap a flexible material, such as clothing, may act as a ligature point and present a risk of ligature to the occupant. In some instances, a toilet may present such a risk to an occupant by presenting ligature points. Therefore, consideration should be given to reducing such a risk. Thus, improvement in this field is desired.

SUMMARY

In certain embodiments, a ligature resistant toilet may include a frame that defines a hollow interior and a bowl assembly that is positioned within the hollow interior of the frame. The frame may be rotationally molded so that the frame is seamless and made from a single, unitary piece to help to prevent ligature points. The frame may include a bottom surface, a front surface, ad left surface and a right surface. In some embodiments, the front surface may be curved. A rear surface may be positioned between the left surface and right surface, opposing the front surface. The frame may also include a top surface that defines a seat assembly that is positioned above the bowl assembly.

The top surface may connect to the front, left, right, and rear surfaces of the frame at a transition surface. The transition surface may include a rounded upper transition edge and a rounded lower transition edge. The rounded edges of the transition surface may assist to reduce the possibility of ligature points and sharp edges on the frame.

The seat assembly on the top surface of the frame may include a seat that is integrally formed with the top surface of the frame. In some examples, the seat may be curved to form a horseshoe shape that has a first end and a second end. A lip may be positioned between the first end and the second end of the seat, and the first and second ends of the seat may be raised with respect to the seat. An inner surface of the seat assembly may form a perimeter that defines a bowl opening that allows access to the bowl of the bowl assembly.

The top surface may also include a top surface platform that extends rearwardly from the seat assembly. The top surface platform may be flat and planar. The transition between the seat assembly and the top surface platform may be rounded to avoid ligature points and sharp edges. In some embodiments, the seat may be raised with respect to the top surface platform.

In some examples, a left ridge may extend through the left surface of the frame so that the left surface is tiered with a top portion that extends outward more than a bottom portion. The left ridge may be rounded to reduce the possibility of ligature points. Likewise, in some embodiments, a right ridge may extend through the right surface of the frame so that right left surface is tiered with a top portion that extends outward more than a bottom portion. The right ridge may be rounded to reduce the possibility of ligature points.

The rear surface of the frame may include an outer section and an inner section that are separated by a rear surface ledge. A rear surface opening may be defined through the rear surface, allowing access to the hollow interior of the frame.

The bowl assembly may be positioned within the hollow interior of the frame. The bowl assembly may include a bowl and a trapway attached to the bowl. The trapway may include a pipe opening for attaching the trapway to a pipe or another plumbing component that connects to exterior plumbing. A spray ring may by positioned on a top surface of the bowl and a seal gasket may be positioned in a cavity formed between the spray ring and the frame. In some embodiments, the inner surface of the seat assembly may surround the spray ring to attach the spray ring and the bowl to the frame.

The pipe that is attached to the trapway may exit the hollow interior of the frame either though the rear surface opening or through a bottom surface opening defined through the bottom surface of the frame. The pipe may include a curved section or a bent section within the interior of the frame to allow the pipe to align with the pipe opening of the trapway and to also align with exterior plumbing.

A method of forming a ligature resistant toilet may comprise rotationally molding the frame of the ligature resistant toilet and attaching the bowl assembly to said frame so that said bowl assembly is positioned within the hollow interior defined by said frame. The rotationally molded frame is a seamless surface with rounded corners that lacks ligature points at which a ligature may be tied or attached to the toilet. The method may further include inserting the seal gasket between the spray ring and the seat assembly of the frame. The seal gasket may assist to prevent liquid from entering the hollow interior of the frame.

Further forms, objects, features, aspects, benefits, advantages, and embodiments of the present invention will become apparent from a detailed description and drawings provided herewith.

DETAILED DESCRIPTION

Figure 1:
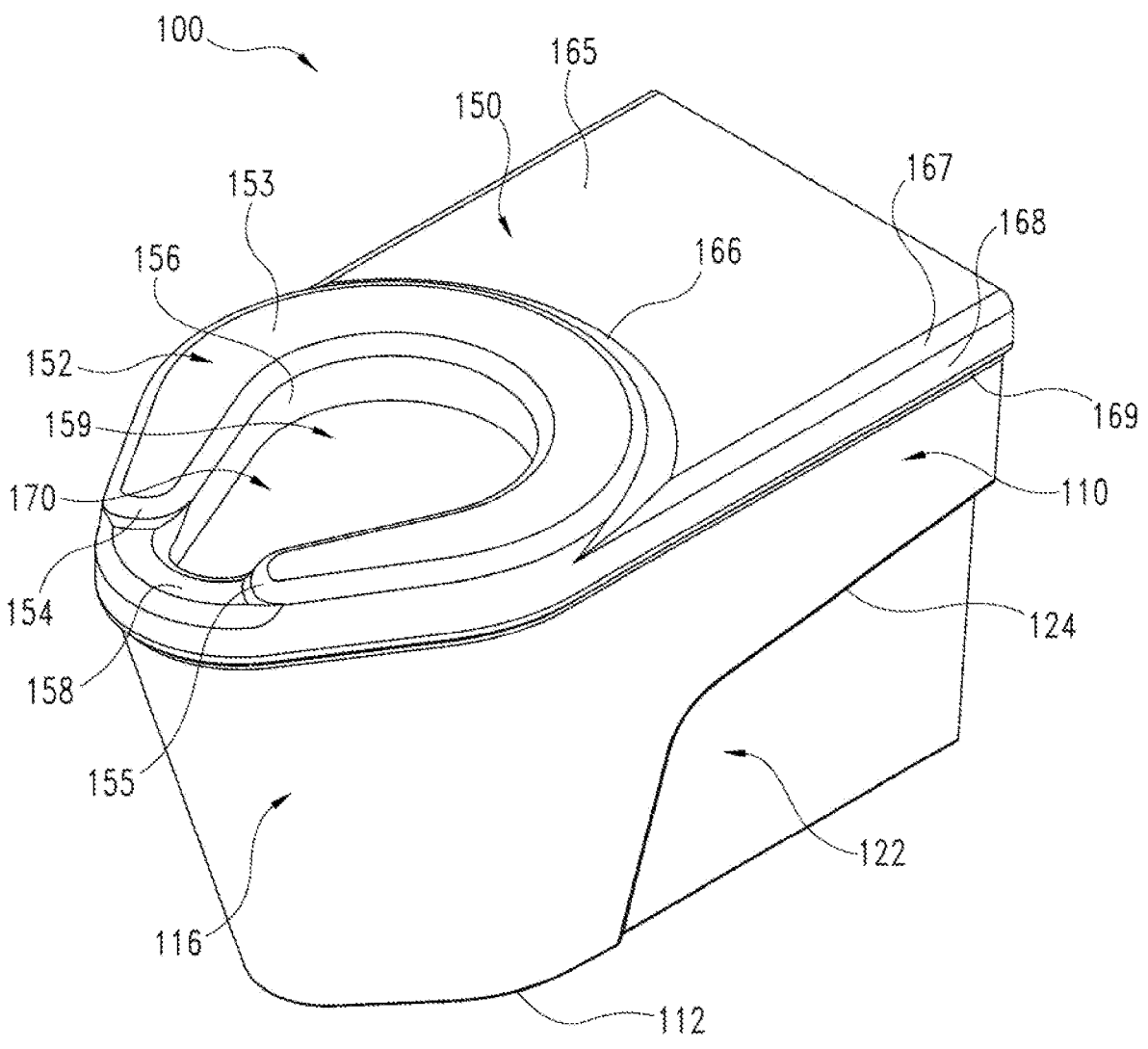
FIG. 1 is a left side perspective view of a ligature resistant toilet.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Spatially relative terms such as "lower", "upper", "under", "over", "above" and the like may be used to describe and element's and/or feature's relationship to another element(s) or feature(s), for example as depicted in the Figures. It will be understood that the spatially relative terms are intended to encompass different operations of the system, device or component in use in addition to the orientation described or depicted in the Figures. For example, if a device or component as depicted in the Figures is inverted, an element that is shown and described as "upper" would then be oriented as "lower".

As disclosed above, aspects of the present disclosure relate to a toilet, and in particular a ligature-resistant toilet that may have at least a portion that is produced through a rotational molding process.

Figure 2:
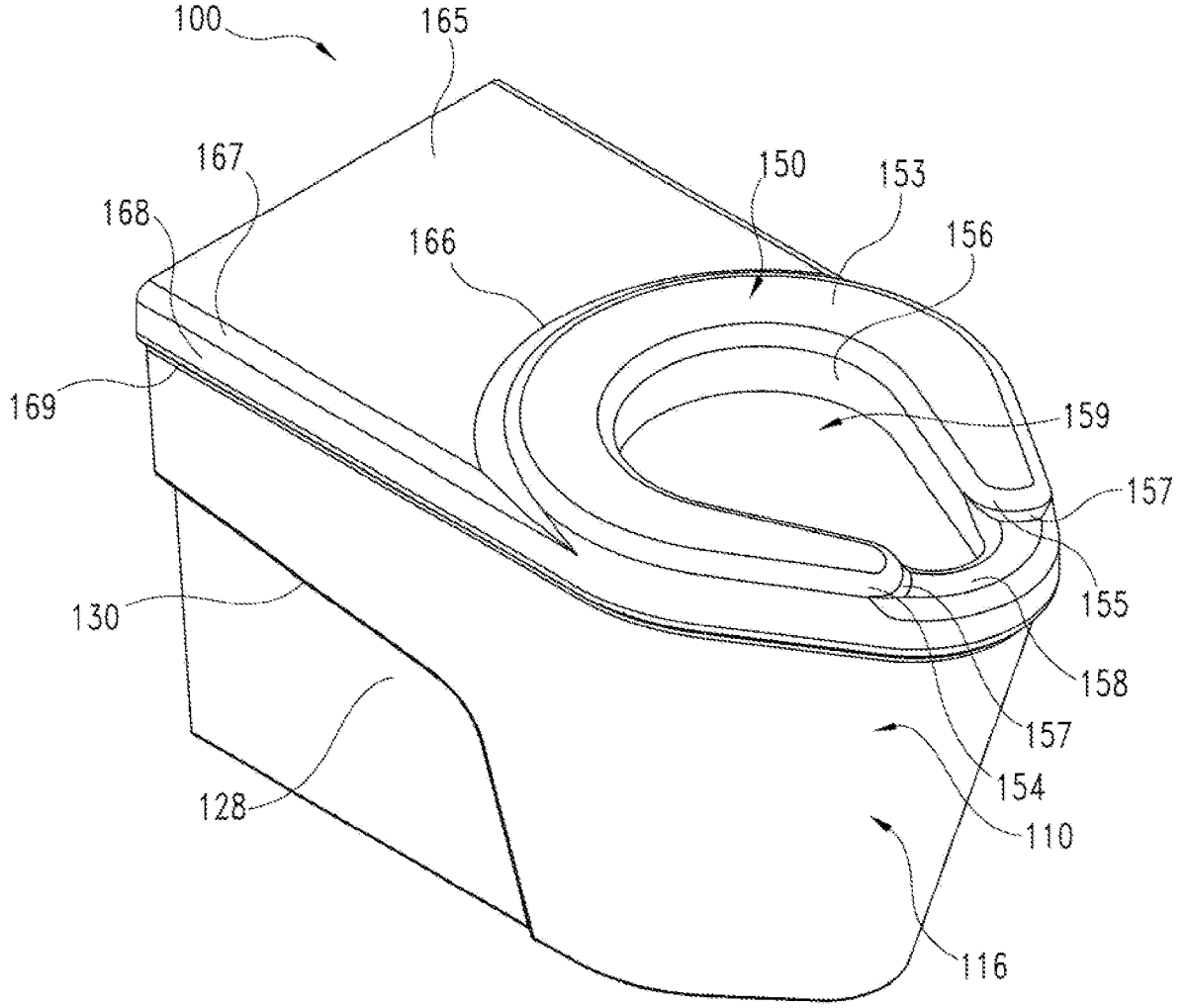
FIG. 2 is a right side perspective view of the ligature resistant toilet of FIG. 1.

FIGS. 1 and 2 illustrate perspective views of a ligature resistant toilet 100. As shown in the perspective view illustrated in FIG. 1, the toilet 100 includes a frame 110 and a bowl assembly 170 that is surrounded by the frame 110. In some embodiments, the frame 110 may be a monolithic structure formed as a seamless, single-piece component. The frame may be made from plastic or a similar suitable material for using with a rotational molding process.

The frame 110 includes a bottom surface 112, a front surface 116, a left surface 122 (see FIG. 1), and a right surface 128 (see FIG. 2). In the embodiment shown, the front surface 116 is curved and is positioned between the left surface 122 and the right surface 128. A rear surface 140 is positioned between the left surface 122 and the right surface 128, opposing the front surface 116 of the frame 110.

The frame 110 also includes a top surface 150 that defines a seat assembly 152 that sits atop the bowl assembly 170. The top surface 150 connects to the front surface 116, the left surface 122, and the right surface 128 at a transition surface 168. A rounded upper transition edge 167 is positioned between the top surface 150 and the transition surface 168. A rounded lower transition edge 169 is positioned between the left surface 122 and the transition surface 168 and between the right surface 128 and the transition surface 168. The rounded transition surface and the rounded upper transition edge 167 and lower transition edge 169 reduce the risk of ligature points on the toilet 100 and eliminates any sharp edges between the top surface 150 and the rest of the frame 110 that could act as a possible source of injury for a user of the toilet 100.

Figure 3:
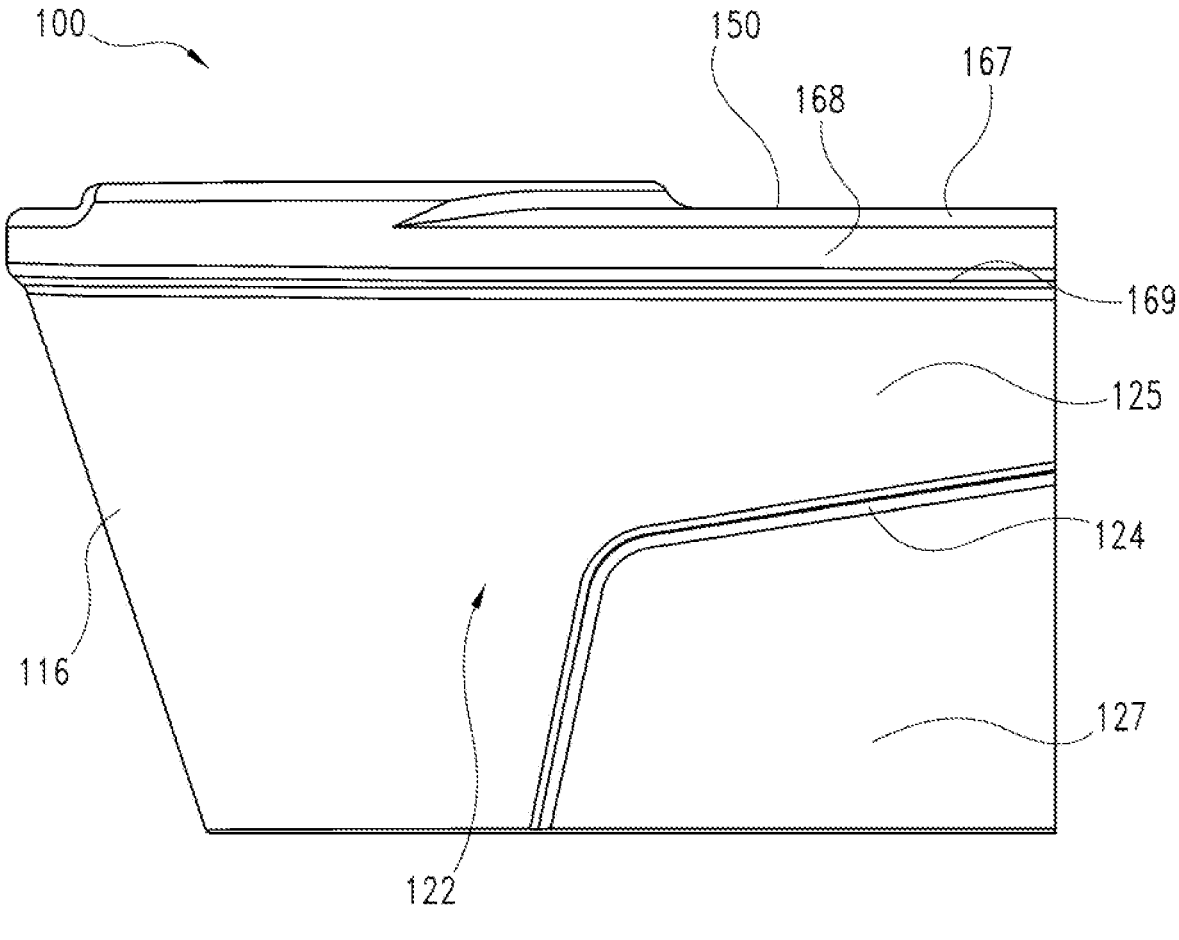
FIG. 3 is a left side view of the ligature resistant toilet of FIG. 1.

As shown in FIG. 3, in some embodiments, a left ridge 124 may extend through the left surface 122 so that the left surface 122 is tiered with a left surface top portion 125 extending outward more than a left surface bottom portion 127. The left ridge 124 may be rounded so that there is a reduced possibility of ligature points at the left ridge 124. In other embodiments, the left ridge 124 may not be present on the left surface 122 so that the left surface 122 is substantially planar.

Figure 4:
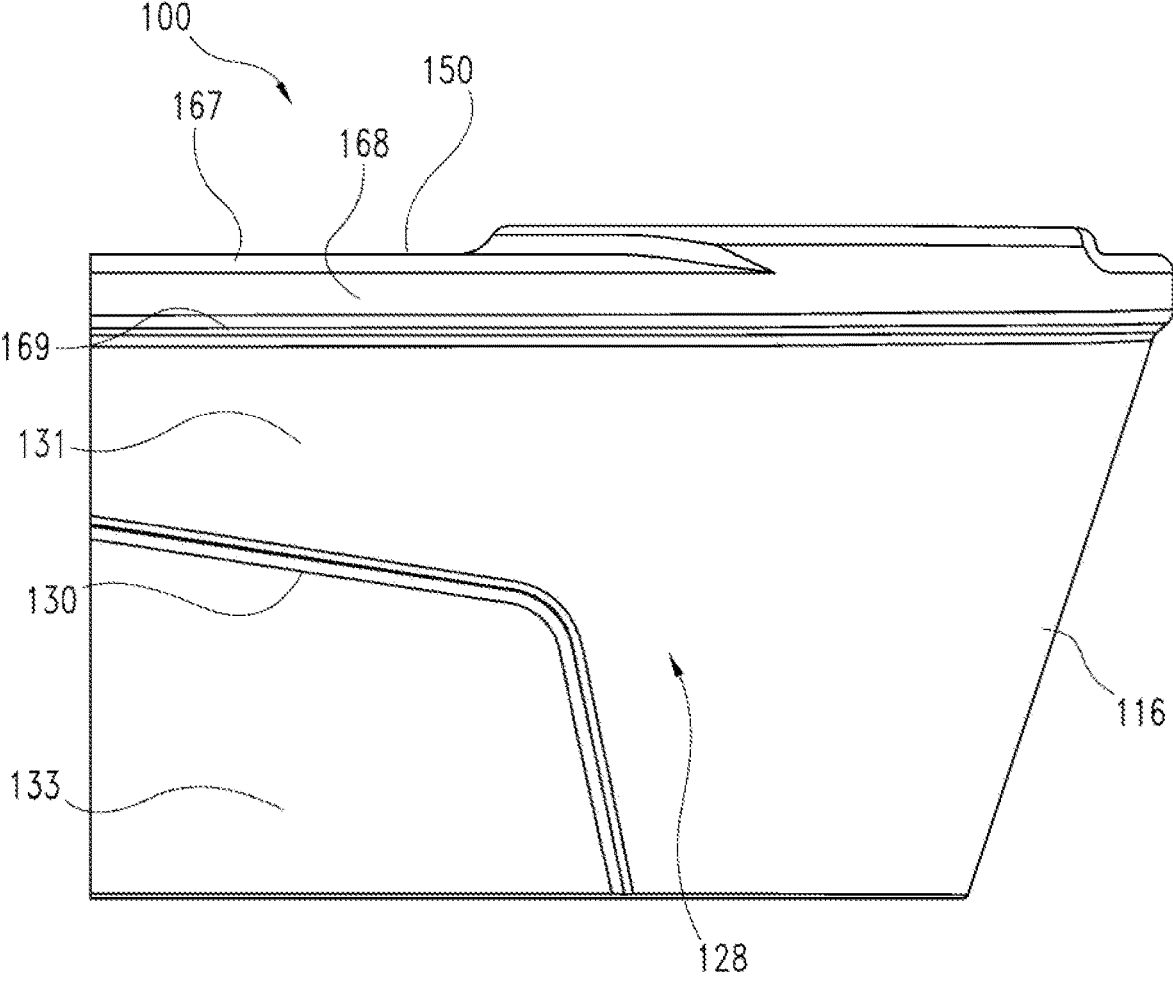
FIG. 4 is a right side view of the ligature resistant toilet of FIG. 1.

As shown in FIG. 4, in some embodiments, a right ridge 130 may extend the right surface 128 of the frame so that the right surface 128 is tiered with a right surface top portion 131 extending outward more than a bottom portion 133 of the right surface 128. The right ridge 130 may have a rounded surface so that there is a reduced possibility of ligature points at the right ridge 130. In other embodiments, the right ridge 130 may not be present on the right surface 128 so that the right surface 128 is substantially planar.

Figure 5:
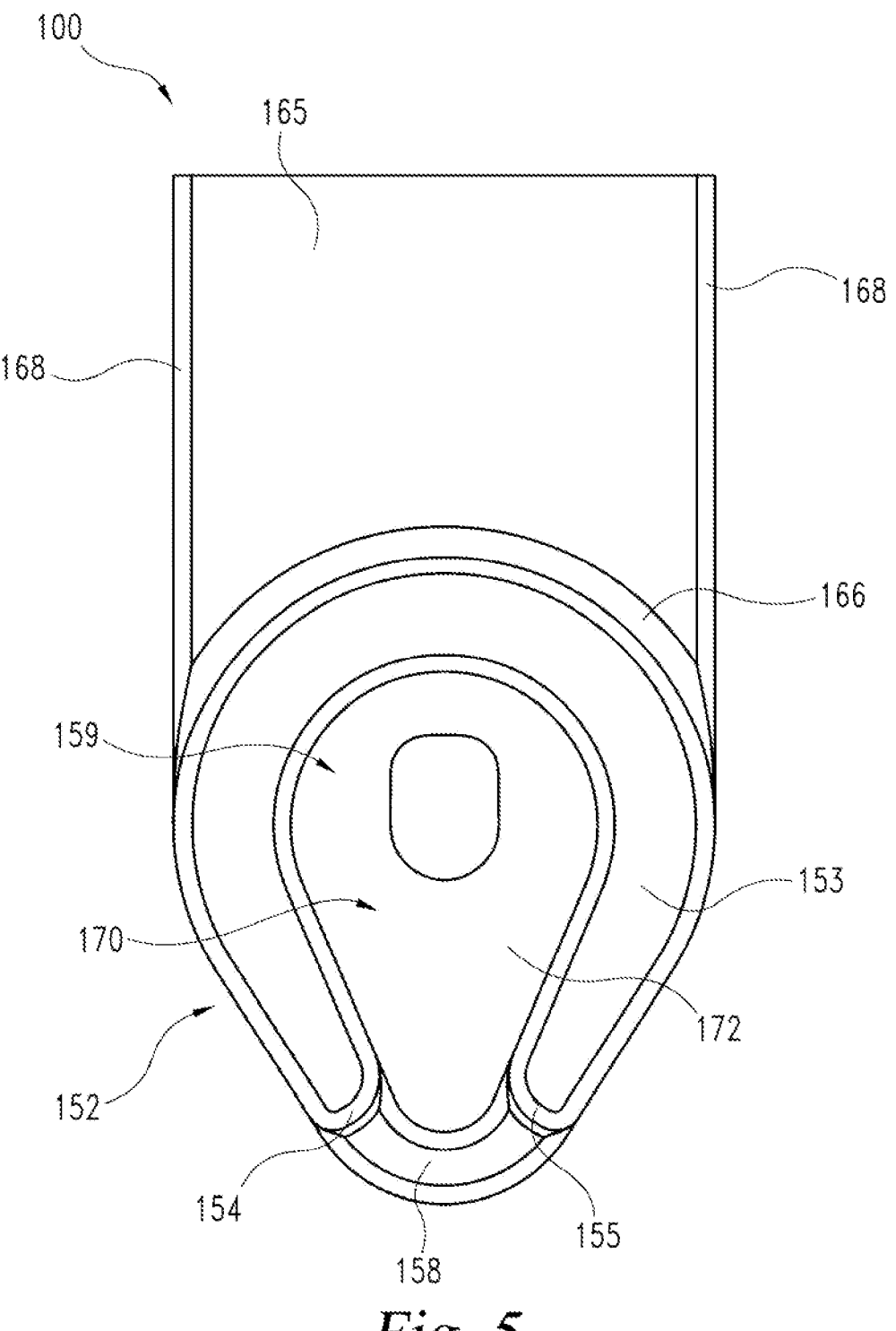
FIG. 5 is a top view of the ligature resistant toilet of FIG. 1.

A top view of the toilet 100 is shown in FIG. 5. As shown, the top surface 150 includes the seat assembly 152 and a top surface platform 165 extending rearwardly from the seat assembly 152. In the embodiment shown, the top surface platform 165 is flat and planar. However, in other embodiments, the top surface platform 165 may have texture or be nonplanar. The transition 166 between the top surface platform 165 and the seat assembly 152 is rounded or curved to avoid possible ligature points at the transition 166.

Figure 6:
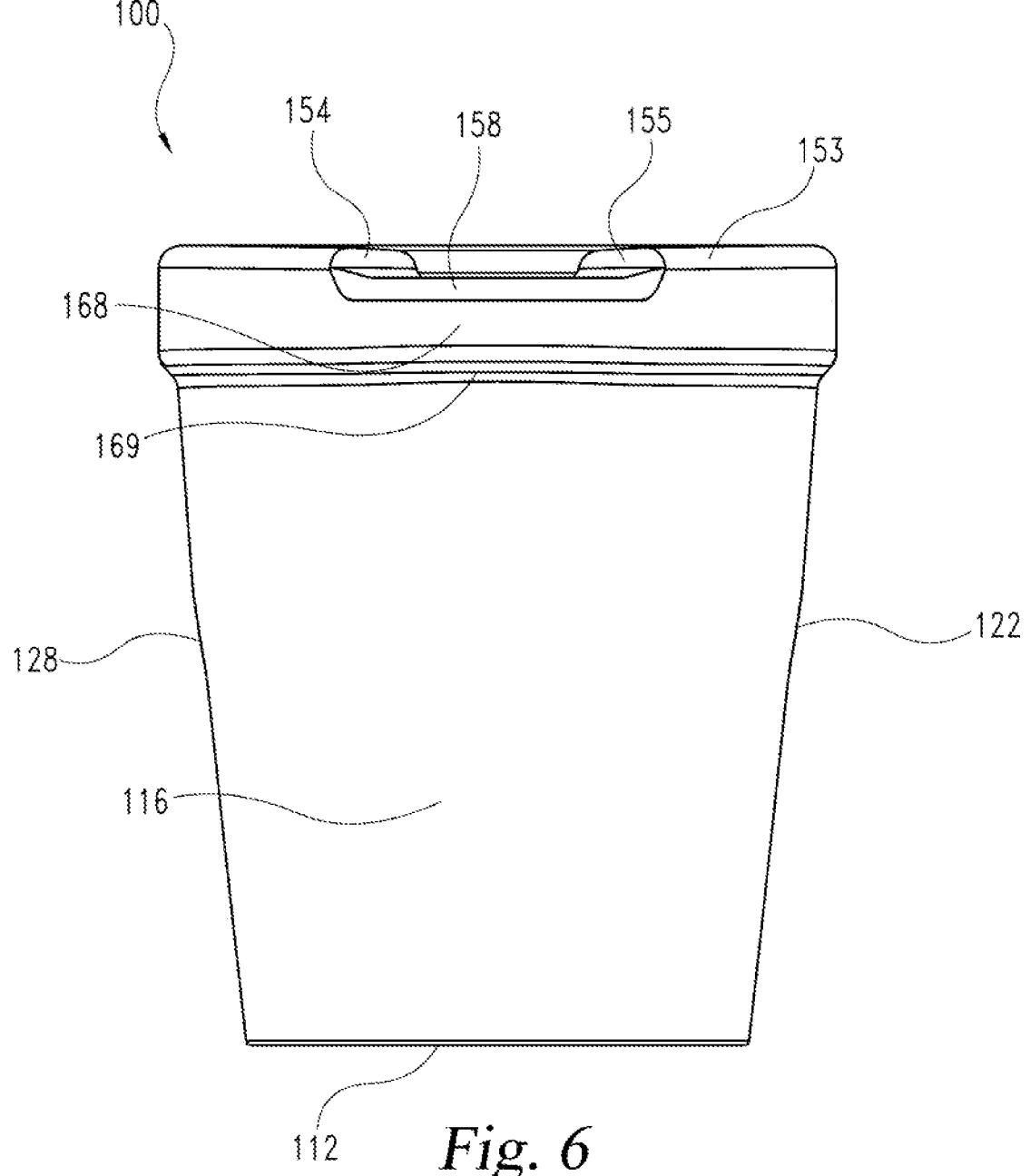
FIG. 6 is a front view of the ligature resistant toilet of FIG. 1.

The seat assembly 152 includes a seat 153 that is raised with respect to the top surface platform 165. The seat 153 is an integrally formed component of the top surface 150 of the toilet 100 and may not be raised and lowered. In this embodiment, the seat 153 is curved to form a horseshoe shape and has a first end 154 and a second end 155. An inner surface of the seat assembly 152 forms a perimeter that defines a bowl recess 159 that allows access to a bowl 172 of the bowl assembly 170. A lip 158 is positioned between the first end 154 and the second end 155 of the seat 153. As shown in FIG. 6, the ends 154, 155 of the seat 153 are raised with respect to the lip 158. The transitions 157 between the lip 158 and the ends 154, 155 of the seat 153 are rounded or curved to avoid sharp edges that may be used as ligature points.

Figure 7:
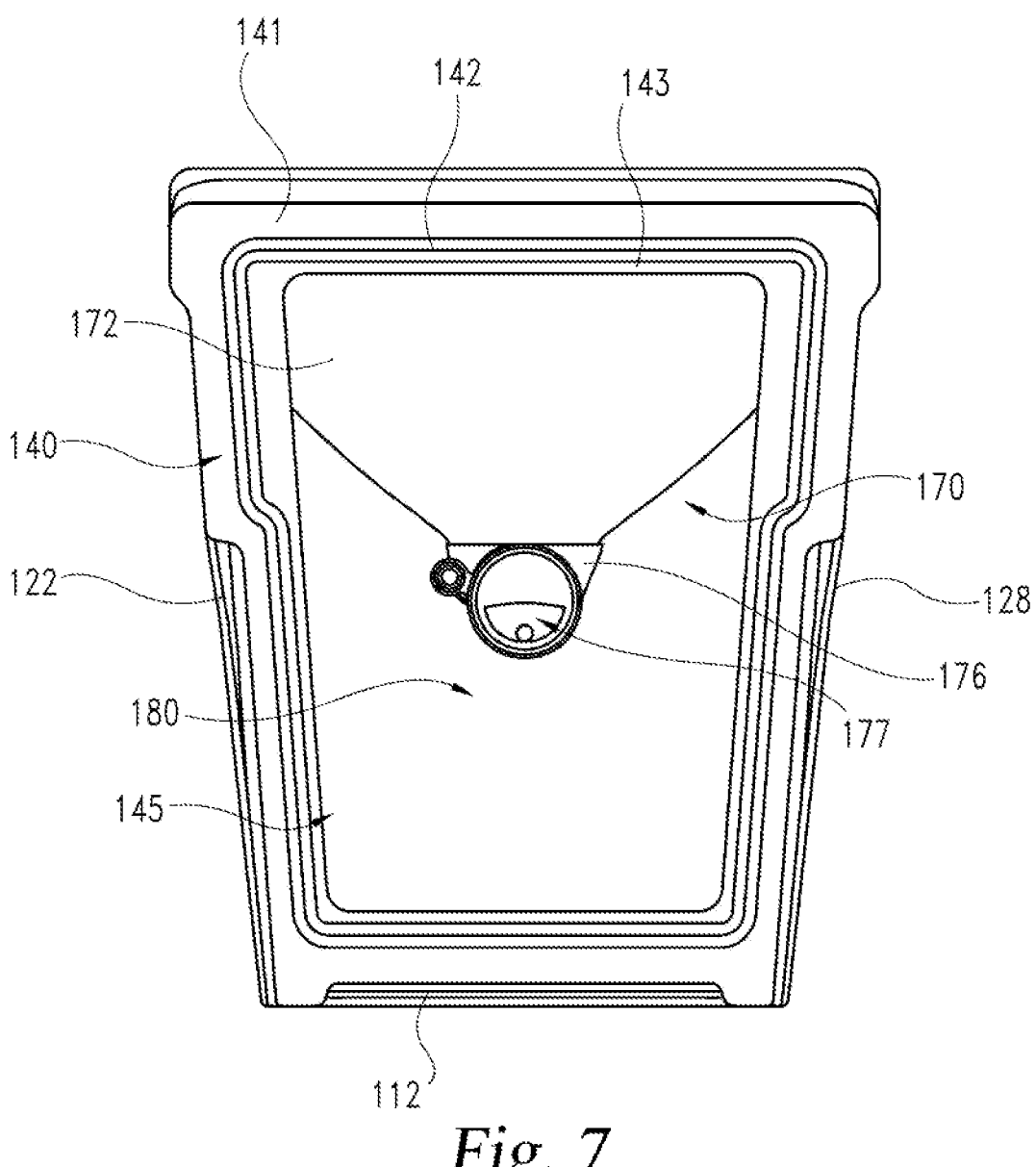
FIG. 7 is a rear view of the ligature resistant toilet of FIG. 1.

A rear view of the toilet 100 is shown in FIG. 7. The rear surface 140 of the frame 110 includes an outer section 141 and an inner section 143. The outer section 141 and the inner section 143 of the rear surface 140 are separated by a rear surface ledge 142 that is contoured so that the inner section 143 is recessed with respect to the outer section 141. The rear surface ledge 142 includes rounded corners and curved surfaces that assist to prevent ligature points. A rear surface opening 145 is defined through the rear surface 140, with the inner section 143 acting as a perimeter surrounding the rear surface opening 145. The rear surface opening 145 allows access to a hollow interior 180 of the toilet 100 which provides space for pipes and other plumbing features that may be necessary to operate the toilet 100.

Bowl 172 of the bowl assembly 170 is shown within the hollow interior 180 of the toilet 100. A trapway 176 is positioned beneath and attached to the bowl 172 of the bowl assembly 170. The trapway 176 includes a tube opening 177 for receiving a plumbing tube for connecting the toilet 100 to an exterior plumbing system. In some embodiments, the bowl 172 and the trapway 176 of the bowl assembly 170 may be made from stainless steel. However, in other embodiments, the bowl 172 and the trapway 176 may be made from any other suitable material as desired.

Figure 8:
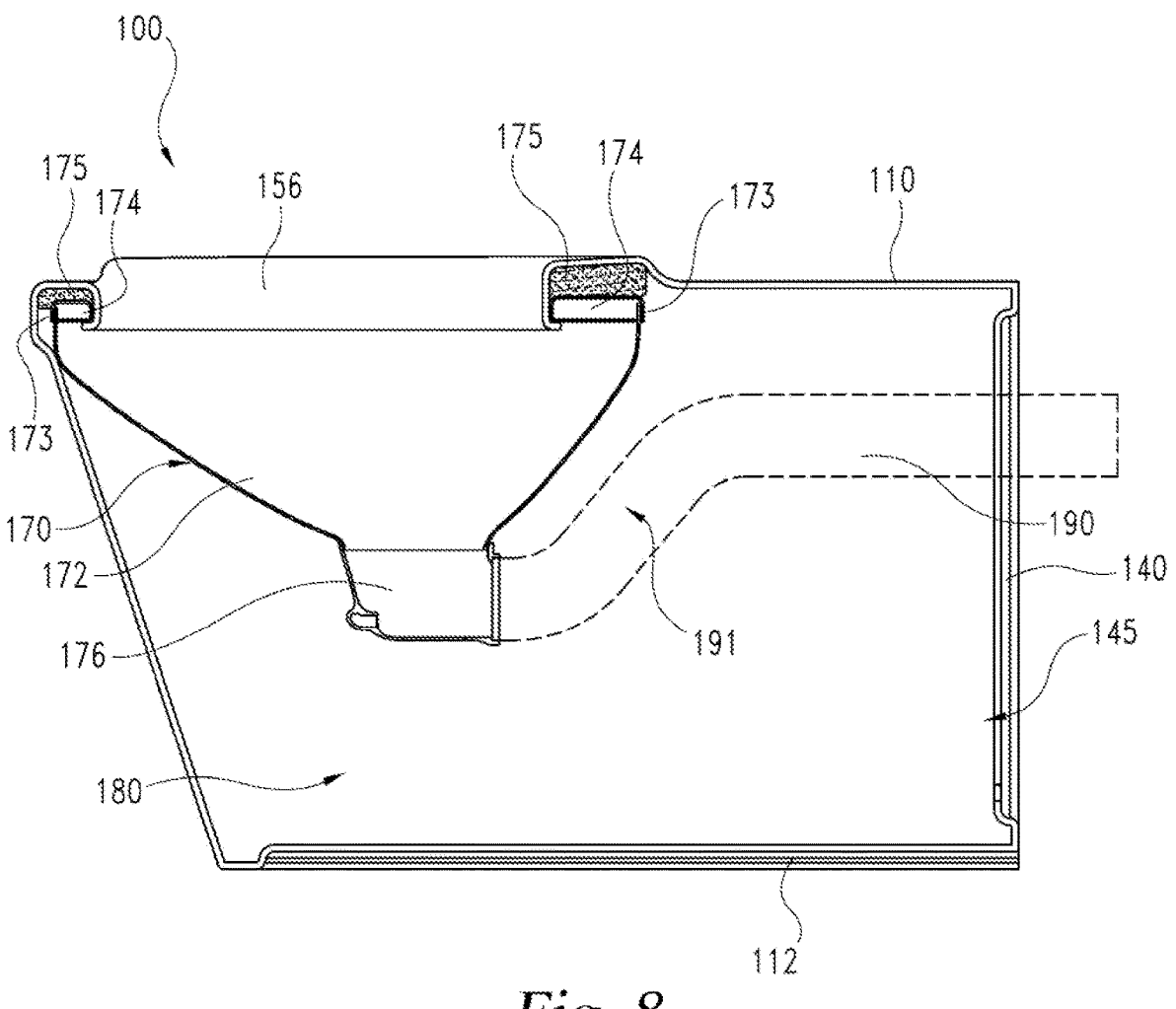
FIG. 8 is a cross-sectional left side view of an embodiment of the ligature resistant toilet of FIG. 1.

A cross-sectional view of the toilet 100 is shown in FIG. 8. The cross-sectional view shows the frame 110 surrounding the hollow interior 180 of the toilet 100. The bowl assembly 170 is positioned within the hollow interior 180 of the toilet 100. A spray ring 174 is positioned on a bowl top surface 173 and may cover the entirety of the top surface of the bowl 172. The inner surface 156 of the seat assembly 152 may wrap around the spray ring 174 to attach the spray ring 174 and the bowl 172 to the frame 110 of the toilet 100. A seal gasket 175 is positioned between the spray ring 174 and the frame 110 to prevent liquid from the spray ring 174 from entering the interior 180 of the frame 110.

In some embodiments, the inner surface 156 of the seat assembly 152 may wrap around the spray ring 174 and the top surface 173 of the bowl 172 so that no edges of the spray ring 174 or the bowl 172 are exposed to a user. This assists to prevent ligature points or sharp edges that may be created by the bowl 172 or the spray ring 174. Therefore, when the toilet 100 is mounted to a support surface, such as a wall, the only portions of the toilet 100 that are accessible to the user is the outer surfaces of the frame 110 and the surface of a portion of the bowl 172 that is accessible through the bowl recess 159. The rounded corners and the one-piece, seamless design of the frame 110 and the smooth surface of the portion of the bowl 172 accessible through the bowl recess 159 reduce the possibility of ligature points and sharp edges on the toilet 100.

Figure 9:
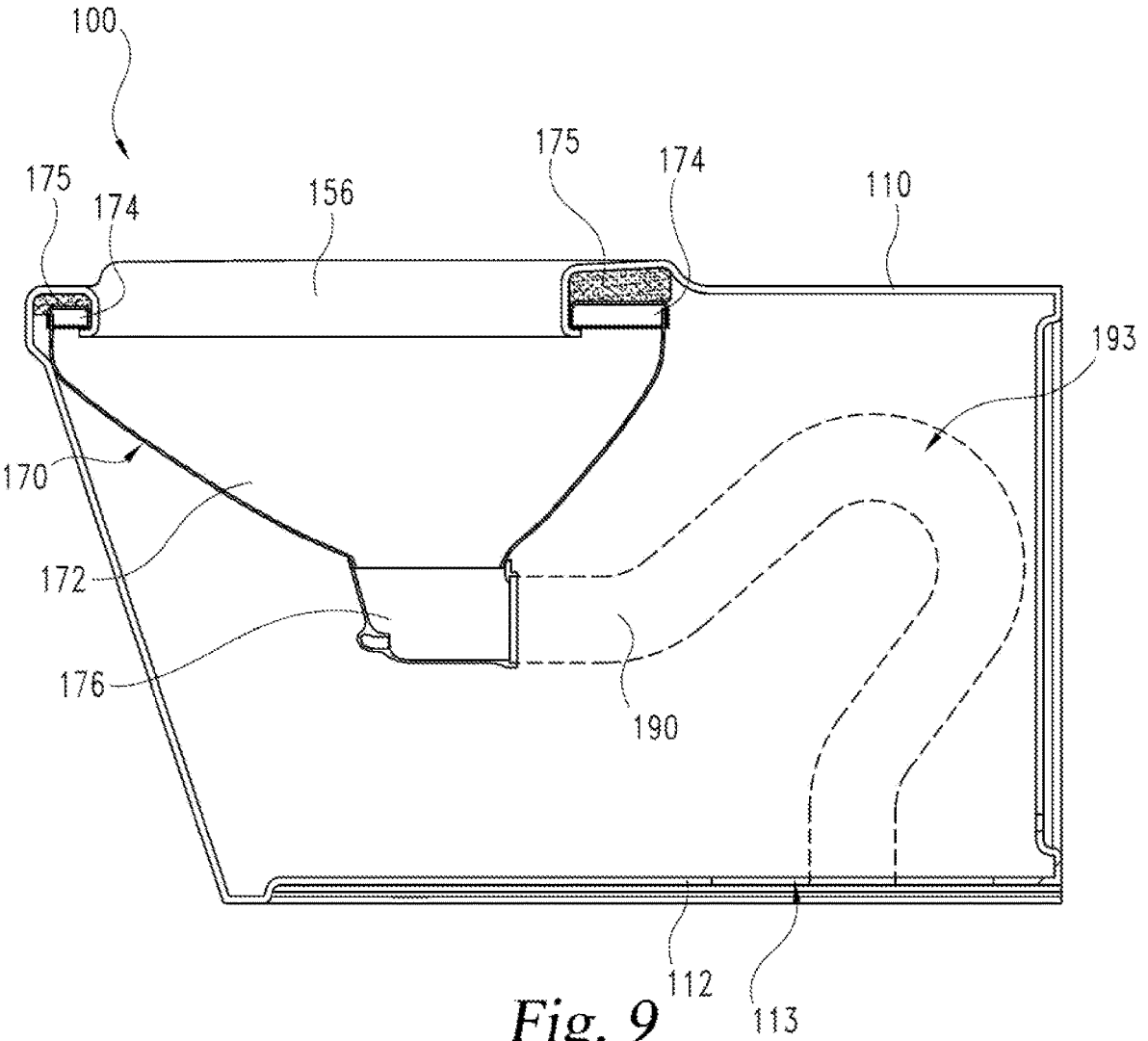
FIG. 9 is a cross-sectional left side view of an embodiment of the ligature resistant toilet of FIG. 1.
Figure 10:
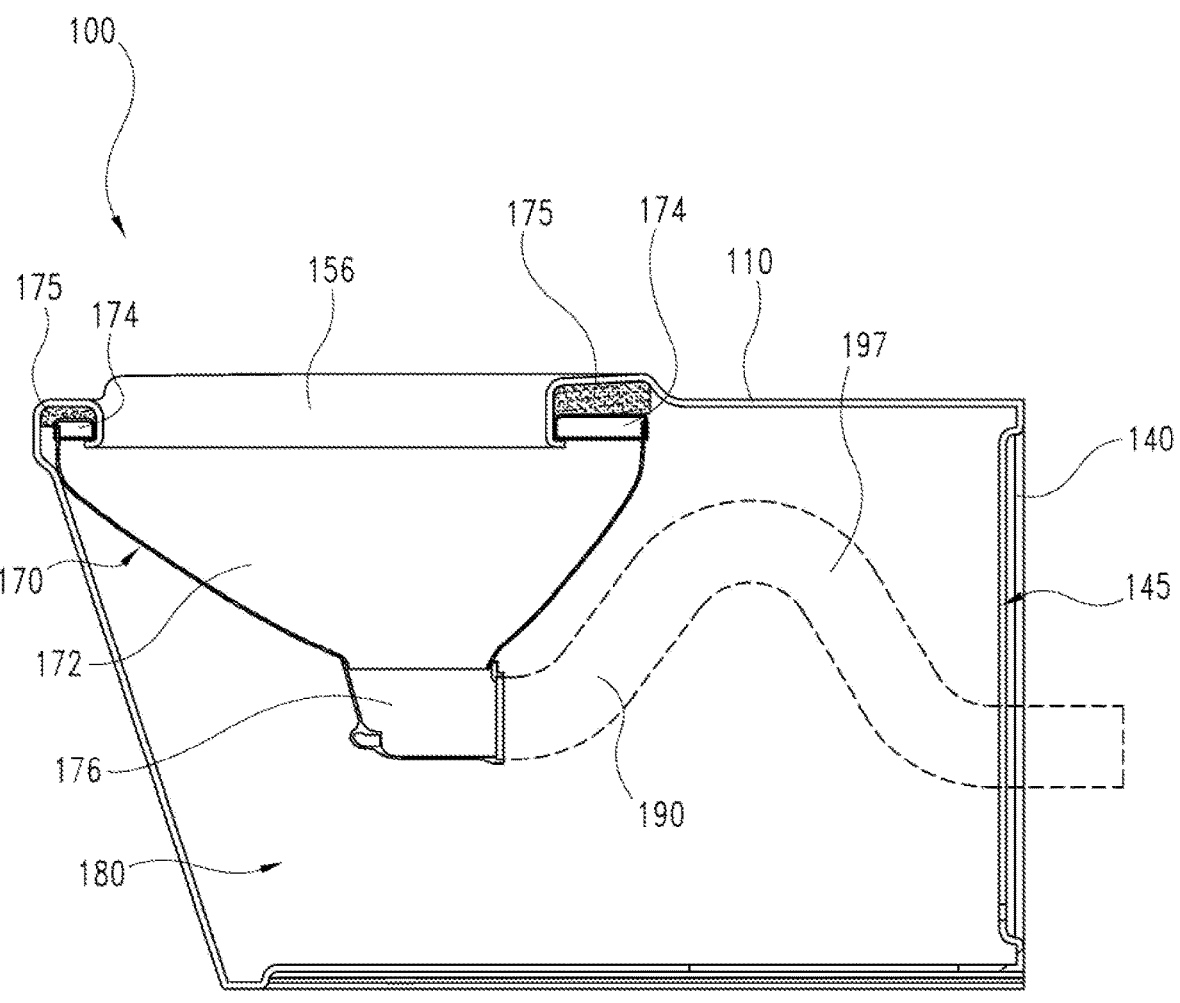
FIG. 10 is a cross-sectional left side view of an embodiment of the ligature resistant toilet of FIG. 1.

The trapway 176 may be attached to a pipe 190 that removes material from the bowl 172 to an exterior plumbing system or to another desired location. In the embodiment shown, the pipe 190 exits the frame 110 at the rear of the frame out of the rear surface opening 145. As shown, in some embodiments, the pipe 190 may have a bent section 191 to change the position of the pipe 190 if necessary to align the pipe 190 with a plumbing outlet positioned exterior to the hollow interior 180 of the toilet 100. In other embodiments, the pipe 190 may have any suitable shape to allow connection between the trapway 176 and exterior plumbing. FIGS. 9-10 show alternative embodiments of the pipe 190. For example, in FIG. 9, the pipe 190 includes a curved section 193 that allows the pipe 190 to exit the hollow interior 180 of the toilet 100 at a bottom surface opening 113 defined through the bottom surface 112 of the frame 110. FIG. 10 illustrated another embodiment in which the pipe 190 includes an S-shaped section 197 and exits the frame 110 of the toilet 100 through the rear surface opening 145 defined through the rear surface 140.

In some embodiments, the frame 110 may include an access panel that allows access to the hollow interior 180 of the frame 110. The access panel may allow easy access to the bowl assembly and other plumbing components within the hollow interior 180 when repairs are necessary. In some embodiments, the access panel may be positioned on the front surface 116 of the frame. In other examples, the access panel may be located on the left surface 122 or on the right surface 128 of the frame 110.

The frame 110 of the ligature resistant toilet 100 may be manufactured using rotational molding. Rotational molding is a manufacturing process that is suitable for creating hollow, one-piece components. The rotational molding process starts with a product material that is usually in powder form, but may be a liquid in some embodiments. Typically, the product material is some variety of polymer or plastic, but other suitable materials may be used as desired. The product material is inserted into a mold that is formed into the shape of the final product. The mold is closed with the product material inside and the mold is rotated about at least two axes. In some embodiments, the mold may also be rotated at varying speeds.

As the mold is rotated, the mold and the product material within the mold is heated. As the mold is rotated, the heated product material is pushed against the walls of the mold through centrifugal force. After the product material has been adhered to the walls of the mold, the mold is cooled to allow the product material to solidify into a final product in the desired shape of the mold. After cooling, the final product is removed from the mold. In some embodiments, the product material will shrink during the cooling process, allowing easy removal of the final product from the mold.

Rotational molding may be beneficial for manufacturing ligature resistant components because rotational molding may be used to creates a seamless product. Therefore, toilet 100 can be produced through rotational molding so that the toilet 100 does not have any seams. A seam may produce a ligature point on a product, so the reduction of seams or the complete elimination of seams on toilet 100 reduces the number of potential ligature points.

The uses of the terms "a" and "an" and "the" and similar references herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the products or methods defined by the claims.

While embodiments of the disclosure have been illustrated and described in detail in the drawings and foregoing description, the same is to be considered as illustrative and not restrictive in character, it being understood that only some embodiments have been shown and described and that all changes and modifications that come within the spirit of the disclosures herein are desired to be protected.

The invention claimed is:

1. A ligature resistant toilet comprising:
   a frame defining a hollow interior and including a top surface with a seat assembly defined on said top surface;
   a bowl assembly positioned within said hollow interior of said frame and supported by said frame;
   wherein said seat assembly includes a seat, and wherein said seat is integrally formed with the top surface of said frame;
   wherein said seat is raised with respect to a top surface platform that extends rearwardly from said seat assembly; and
   wherein said frame is a monolithic structure formed by rotational molding.

2. The ligature resistant toilet of claim 1, wherein said frame includes a curved front surface positioned between a left surface and a right surface.

3. The ligature resistant toilet of claim 2, wherein a rounded transition edge is positioned between said curved front surface and said left surface of said frame, and wherein a rounded transition edge is positioned between said top surface and said right surface of said frame.

4. The ligature resistant toilet of claim 1, wherein said seat assembly is positioned atop the bowl assembly.

5. The ligature resistant toilet of claim 1, wherein a top surface platform extends rearwardly from said seat assembly.

6. The ligature resistant toilet of claim 5, wherein a rounded transition is positioned between said top surface platform and said seat assembly.

7. The ligature resistant toilet of claim 1, wherein a lip is positioned between a first end of said seat and a second end of said seat, and wherein said first end and said second end of said seat are raised with respect to said lip.

8. The ligature resistant toilet of claim 1, wherein the bowl assembly includes a bowl positioned within said hollow interior of said frame and a spray ring attached at a top surface of said bowl.

9. The ligature resistant toilet of claim 8, wherein an inner surface of said seat assembly is wrapped around said spray ring to attach said spray ring and said bowl to said frame.

10. The ligature resistant toilet of claim 9, further comprising:

a seal gasket positioned between said spray ring and said frame, wherein said seal gasket is configured to prevent liquid from entering the hollow interior of said frame.

11. The ligature resistant toilet of claim 8, wherein said bowl assembly includes a trapway attached to said bowl, and wherein said trapway includes a tube opening configured to receive a pipe to connect the toilet to an exterior plumbing system.

12. The ligature resistant toilet of claim 11, wherein said pipe connecting the toilet to the exterior plumbing system exits said frame at a rear surface opening.

13. The ligature resistant toilet of claim 11, wherein said pipe connecting the toilet to the exterior plumbing system exits said frame at a bottom surface opening.

14. A method comprising the steps of:

rotationally molding a frame of a ligature resistant toilet, wherein said frame defines a hollow interior and includes a top surface with a seat assembly defined on said top surface;

attaching a bowl assembly to said frame so that said bowl assembly is positioned within a hollow interior defined by said frame, wherein said bowl assembly includes a bowl;

wherein said seat assembly includes an inner surface, and wherein said inner surface of said seat assembly is wrapped around a top surface of said bowl of said bowl assembly to attach said bowl assembly to said frame; and wherein said frame is seamless and monolithic.

15. The method of claim 14, wherein said bowl assembly includes a spray ring and wherein said inner surface of said seat assembly is wrapped around said spray ring when said bowl assembly is attached to said frame.

16. The method of claim 15, further comprising, inserting a seal gasket between said spray ring and said seat assembly of said frame.

17. The method of claim 14, further comprising, attaching a trapway of the bowl assembly to a pipe, wherein at least a portion of said pipe is positioned within said hollow interior of said frame and at least a portion of said pipe is exterior of said frame.

18. A ligature resistant toilet comprising:

a frame defining a hollow interior and including a top surface with a seat assembly defined on said top surface;

a bowl assembly positioned within said hollow interior of said frame and supported by said frame;

wherein said seat assembly includes an inner surface, and wherein said inner surface of said seat assembly is wrapped around a top surface of said bowl of said bowl assembly to attach said bowl assembly to said frame;

wherein said frame is a monolithic structure formed by rotational molding.

\* \* \* \* \*